(12) United States Patent
Stössel et al.

(10) Patent No.: US 10,449,911 B2
(45) Date of Patent: Oct. 22, 2019

(54) COMPONENT HAVING A TWO-DIMENSIONALLY EXTENDING DECORATIVE ELEMENT

(71) Applicant: WEIDPLAS GmbH, Rapperswil (CH)

(72) Inventors: Marcel Stössel, Kaltbrunn (CH); Fredi Pfister, Pfäffikon (CH); Josef Benz, Uznach (CH); Nikolai Baltzer, Rapperswil (CH)

(73) Assignee: WEIDPLAS GmbH, Rapperswil (CH)

( * ) Notice: Subject to any disclaimer, the term of this patent is extended or adjusted under 35 U.S.C. 154(b) by 699 days.

(21) Appl. No.: 15/058,473

(22) Filed: Mar. 2, 2016

(65) Prior Publication Data

US 2016/0176367 A1 Jun. 23, 2016

Related U.S. Application Data

(62) Division of application No. 13/395,383, filed as application No. PCT/CH2009/000364 on Nov. 16, 2009, now Pat. No. 9,302,633.

(30) Foreign Application Priority Data

Sep. 11, 2009 (EP) ..................... 09405154

(51) Int. Cl.
 *B60R 13/04* (2006.01)
 *B60R 13/02* (2006.01)
 *B29C 45/14* (2006.01)
 *B29L 31/00* (2006.01)
 *B29L 31/30* (2006.01)

(52) U.S. Cl.
 CPC .......... *B60R 13/04* (2013.01); *B29C 45/1418* (2013.01); *B29C 45/14811* (2013.01); *B60R 13/02* (2013.01); *B29L 2031/30* (2013.01); *B29L 2031/3055* (2013.01); *B29L 2031/722* (2013.01); *B60R 2013/046* (2013.01); *Y10T 156/1043* (2015.01); *Y10T 428/24339* (2015.01)

(58) Field of Classification Search
 None
 See application file for complete search history.

(56) References Cited

U.S. PATENT DOCUMENTS 2,116,476 A   5/1938   Nelson
3,531,881 A  10/1970   Carley
(Continued)

FOREIGN PATENT DOCUMENTS

CA   2 366 480 A1    7/2003
DE   41 31 340 C1   11/1992
(Continued)

OTHER PUBLICATIONS

International Search Report of PCT/CH2009/000364 dated Dec. 29, 2010.

*Primary Examiner* — Jeffry H Aftergut
(74) *Attorney, Agent, or Firm* — Sughrue Mion, PLLC

(57) ABSTRACT

Before back molding, the planar decorative element is provided with through-holes. At least in the area of the through-holes, a film is applied to the rear of the planar decorative element. When a plastic melt is introduced, for example by way of injection molding or extruding, the pressure of the plastic melt presses the film into said through-holes. The component is used, in particular, to produce an illuminable field, for example, of a door sill protector of a motor vehicle.

12 Claims, 3 Drawing Sheets

(56) References Cited

U.S. PATENT DOCUMENTS

| | | | |
|---|---|---|---|
| 3,839,129 A | 10/1974 | Neumann | |
| 4,985,194 A | 1/1991 | Watanabe | |
| 5,234,744 A | 8/1993 | Kenmochi | |
| 5,641,221 A * | 6/1997 | Schindele | B60R 13/02 315/84 |
| 6,132,834 A | 10/2000 | Ackeret et al. | |
| 6,416,844 B1 * | 7/2002 | Robson | B44C 1/228 427/164 |
| 6,419,306 B2 * | 7/2002 | Sano | B60Q 1/323 296/209 |
| 6,939,597 B2 | 9/2005 | Winget et al. | |
| 7,712,933 B2 * | 5/2010 | Fleischmann | B60Q 1/2696 362/495 |
| 2001/0040393 A1 | 11/2001 | Sano et al. | |
| 2003/0227780 A1 | 12/2003 | Katsuo et al. | |
| 2009/0226676 A1 | 9/2009 | Smith et al. | |
| 2010/0136298 A1 | 6/2010 | Marion et al. | |

FOREIGN PATENT DOCUMENTS

| | | |
|---|---|---|
| DE | 44 21 942 A1 | 1/1996 |
| DE | 93 21 214 U1 | 9/1996 |
| DE | 197 29 780 C1 | 1/1999 |
| DE | 197 32 425 A1 | 2/1999 |
| DE | 199 48 664 A1 | 4/2001 |
| DE | 19949964 A1 | 4/2001 |
| DE | 201 03 133 U1 | 6/2001 |
| DE | 102 11 171 A1 | 1/2004 |
| DE | 202 19 391 U1 | 4/2004 |
| DE | 20 2004 008 681 U1 | 8/2004 |
| EP | 1 219 401 A2 | 7/2002 |
| EP | 0 890 424 B1 | 2/2003 |
| EP | 1 344 687 A2 | 9/2003 |
| EP | 1344687 A2 * | 9/2003 |
| EP | 1 484 173 A2 | 12/2004 |
| EP | 2 028 048 A1 | 2/2009 |
| FR | 2 387 708 A1 | 11/1978 |
| FR | 2 906 513 A1 | 4/2008 |
| JP | 59001236 A2 | 1/1984 |
| JP | 1-222944 A | 9/1989 |
| JP | 2007-118376 A | 5/2007 |

* cited by examiner

COMPONENT HAVING A TWO-DIMENSIONALLY EXTENDING DECORATIVE ELEMENT

CROSS REFERENCE TO RELATED APPLICATIONS

This application is a Rule 53(b) Divisional application of U.S. application Ser. No. 13/395,383 filed May 29, 2012, which is a National Stage of International Application No. PCT/CH2009/000364 filed Nov. 16, 2009, claiming priority based on European Patent Application No. 09405154.7 filed Sep. 11, 2009, the contents of all of which are incorporated herein by reference in their entirety.

BACKGROUND OF THE INVENTION

The invention relates to a component with a two-dimensionally extending decorative element.

Components having a two-dimensionally extending decorative element are known particularly in automobile construction. For example, DE 44 21 942 C2 discloses a component which comprises an illuminable field, such as for example lettering or symbols, and is provided as a door sill protector strip or bar for a vehicle. The two-dimensionally extending decorative element is formed by a wall part which comprises openings that have been produced by lasering, stamping or the like. A luminous foil is applied on a backside of the wall part. An intermediate part made of a translucent plastic is arranged between this luminous foil and the wall part. This intermediate part has elevations which project into said openings. This intermediate part is fastened on the wall part, for example by adhesive bonding or screwing.

DE 20 2004 008 681 U1 discloses a component which is provided for a floor tray edge of an automobile. An intermediate part is likewise provided in this case, which has elevations that engage into corresponding openings of the two-dimensionally extending decorative element. A light source is also provided on the backside of the decorative element. A decorative body comprising illuminable decorative elements has also been disclosed by EP 2 028 048 A1.

U.S. Pat. No. 6,419,306 A discloses an illuminable plate for motor vehicles, which has a two-dimensionally extending decorative element comprising through-holes, a multi-layered foil and a light guide. In order to obtain a viewing side, the through-holes are filled with transparent plastic.

If the intention is to produce a component with lettering, which comprises for example the letters A and B, then these letters respectively contain at least one island-shaped part which needs to be positioned accordingly. This is possible, for example, using struts. Such struts, however, are often not desired for aesthetic reasons. It is known to position these island-shaped parts in an injection-molding tool by means of a vacuum. This, however, is comparatively elaborate. Furthermore, the island-shaped parts need to be positioned in indentations of the injection-molding tool, which may be done by a gripper or manually. It has also been found that said island-shaped parts are not always exactly flush with the surface of the two-dimensionally extending decorative element in the component finally produced.

SUMMARY OF THE INVENTION

It is an object of the invention to provide a component of said type which can be produced in a simpler manner.

In the component according to the invention, the at least one through-hole is filled at least partially, and preferably fully, by the foil. If an island-shaped part is provided, then this is fixed by the foil before applying the at least one layer. Another advantage is that the at least one island-shaped part is positioned particularly reliably by the engagement of the foil into the at least one through-hole, and that external influences, for example temperature changes and moisture, cannot affect the precise positioning of the island-shaped part. This can be additionally improved by engagement of the at least one layer into the foil. Preferably, the foil is flush with the viewing side. Since the decorative element is not directly back-molded, but instead the foil is molded on, the injection point can be freely selected. It could also take place in the region of an island-shaped part, since this part is protected by the foil and, in particular, displacements of the part due to the molding pressure can be avoided.

It has been found that the component according to the invention has the particular advantage that the foil which has penetrated into the at least one through-hole removes or negates sharp edges of the two-dimensionally extending decorative element in the region of the at least one through-hole. Intermediate spaces in the region of the at least one through-hole can be avoided, so that contamination can be avoided even during prolonged use. The method by which the component according to the invention can be produced is therefore also suitable for producing a component in which the two-dimensionally extending decorative element does not comprise island-shaped parts.

In particular, the method is suitable for producing a component with which an illuminable field can be produced in the interior region or exterior region of a motor vehicle. For example, but not exclusively, such a component is suitable for producing a door sill protector strip, a trim strip, a control element, for example a button.

According to one refinement of the invention, the foil is adhesively bonded onto the backside of the two-dimensionally extending decorative element. Adhesive bonding of the foil can be carried out particularly simply and reliably by means of a roller. An adhesion promoter may be applied on the foil and/or the decorative element.

The foil is, in particular, a plastic foil. It may be colorless, or white, or alternatively colored. Using colored plastic foils, correspondingly tinted illuminable fields can be produced. Preferably, the foil is at least locally translucent. The foil may be single-layered or multilayered. Preferably, the at least one foil is at least locally translucent. An embodiment comprising a plurality of foils, which may be the same or different, may also be envisaged.

According to one refinement of the invention, the at least one layer is produced by injection molding or extrusion. In all these cases, a pressure is exerted onto the foil, by which a region of the foil is pressed into the at least one through-hole and finally engages at least partially into the latter. The at least one layer preferably in turn engages into the foil. Finally, a very stable composite of at least three layers is obtained. Production by injection molding is preferred, since in this case there are essentially no restrictions in terms of the shape of the component, while components produced by extrusion must be essentially in web form. Injection embossing, which is a form of injection molding, is also possible.

The two-dimensionally extending decorative element is produced from a metal sheet. In principle, however, the two-dimensionally extending decorative element may for example also be produced from plastic. The plastic decorative element may be at least partially translucent. The decorative element may be a very thin and highly flexible foil, since the decorative element is supported by the e.g.

molded plastic layer. The plastic layer may be provided with fastening parts, by which the component can be fastened.

According to one refinement of the invention, the at least one island-shaped part is fixed in a holder by means of a vacuum before the foil is applied. After the foil has been applied, the vacuum can be released and, for example, the two-dimensionally extending decorative element with the foil may be placed into the mold cavity of an injection-molding tool. It is then no longer absolutely necessary to fix the island-shaped part in the injection-molding tool, or alternatively in the extruder.

The component according to the invention, produced by the method, has at least three layers. The first layer is formed by the two-dimensionally extending decorative element and the second layer by the foil applied onto the backside of this decorative element. The foil engages into the through-holes in the region of these, and therefore fills these through-holes at least partially. On the viewing side of the component, the foil is preferably flush with this viewing side in the region of the through-holes. This viewing side forms a flat or alternatively non-flat, for example curved, surface with the optionally provided island-shaped parts. Outside the at least one through-hole, elevations or indentations may of course also be envisaged. Such a component may have a comparatively small thickness of a few millimeters. The molded layer is in particular a supporting layer provided with fastening parts, while the decorative element may be very thin and flexible. In particular, it is possible to ensure that island-shaped parts are flush with the viewing side.

If illumination of the through-holes is provided, then for example a light guide, on which a light source is arranged, may be provided on the backside of the component. The light source may be formed by one or more LEDs. Illumination merely with LEDs or an electroluminescent foil is also possible. The component according to the invention is intended in particular for automobile construction, although applications in other fields may also be envisaged. For example, an illuminable field for an item of furniture or a domestic appliance, for example refrigerators, food steamers, washing machines, ovens, cookers or dishwashers, may be produced with such a component. In order to achieve maximally uniform illumination, it is advantageous that, according to one refinement of the invention, the foil and/or the at least one layer is or are formed as a diffuser.

BRIEF DESCRIPTION OF THE DRAWINGS

Exemplary embodiments of the invention will be explained in more detail below with the aid of the drawing, in which.

DETAILED DESCRIPTION OF THE PREFERRED EMBODIMENTS

Figure 1:
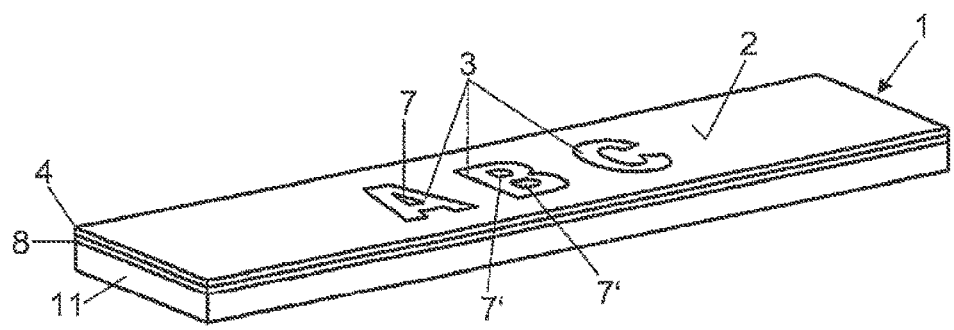
FIG. 1 schematically shows a three-dimensional view of a component according to the invention

FIG. 1 shows a component 1 which has a flat or non-flat viewing side 2, on which a field 3 that represents the letters A, B and C can be seen. These letters are in this case merely an example of such a field, which may be configured arbitrarily per se. The field 3 may be illuminable. The illumination means necessary for this are not represented here, but are known per se to the person skilled in the art.

Figure 2:
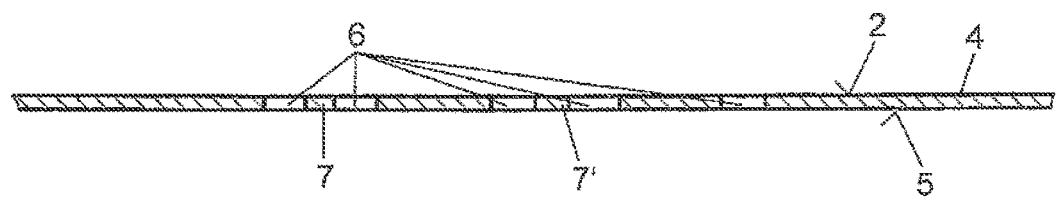
FIG. 2 shows a section through a portion of the two-dimensionally extending decorative element.

The field 3 is formed by the through-holes 6, shown in FIG. 2, in a two-dimensionally extending decorative element 4. These through-holes 6 are produced, for example, by lasering or stamping. The two-dimensionally extending decorative element 4 is for example a metal sheet, for example of aluminum. In principle, however, the two-dimensionally extending decorative element 4 may also be produced from a different material, for example plastic. Preferably, the two-dimensionally extending decorative element 4 has a comparatively small thickness, for example one millimeter or less than one millimeter, preferably less than 0.5 millimeter. The two-dimensionally extending decorative element 4 may be covered with a protective foil, which is generally removed after installation.

The two-dimensionally extending decorative element 4 has a backside 5, onto the surface of which a foil 8 is applied. This foil 8 is formed by a preferably translucent or at least partially transparent layer of plastic. The thickness of the foil 8, or layer, is preferably one millimeter or less than one millimeter, and preferably more than 0.05 millimeter. The thickness is preferably from 0.1 to 0.3 millimeter. The foil 8 is produced for example from ABS, polycarbonate or PMMA. The foil 8 may be multilayered, for example two-layered. In particular, an upper layer measuring for example 5 µm is produced from PVDF (polyvinylidene fluoride) or PES (polyether sulfone) and a lower layer is produced from PMMA, the total thickness of the foil being for example 50 µm. The upper layer may also be a mixture, in particular comprising PVDF and PMMA. The multilayered foil may, for example, be produced by coextrusion. The foil may also be single-layered, consisting of PVDF or PES or a mixture of PVDF and PMMA. A single-layered foil, for example of PMMA, may be coated with a protective varnish. Such foils are particularly resistant against aggressive environmental influences, for example against acids and cleaning agents. If the lower layer is of PMMA, then a particularly good bond with the supporting layer 11 can be achieved when the latter is produced from a similar material, or PMMA.

The component 1 has a further layer 11, which is formed by a thermoplastic that is molded on a backside 10 of the foil 8. In the region of the through-holes 6, the foil 4 is pressed by the layer 11 into these through-holes 6. The foil 8 therefore has, according to FIG. 4, regions 8' which are visible on the viewing side 2.

Figure 3:
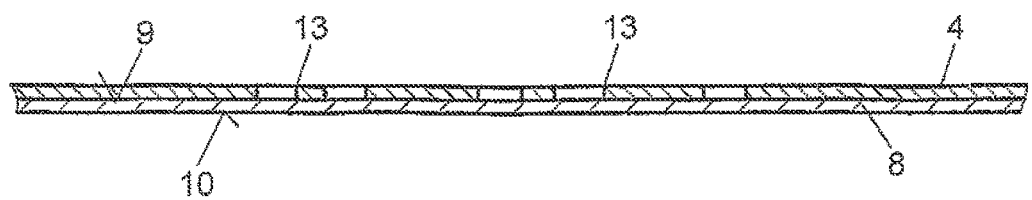
FIG. 3 shows a section according to FIG. 2, a foil being applied onto the backside of the two-dimensionally extending decorative element.
Figure 6:
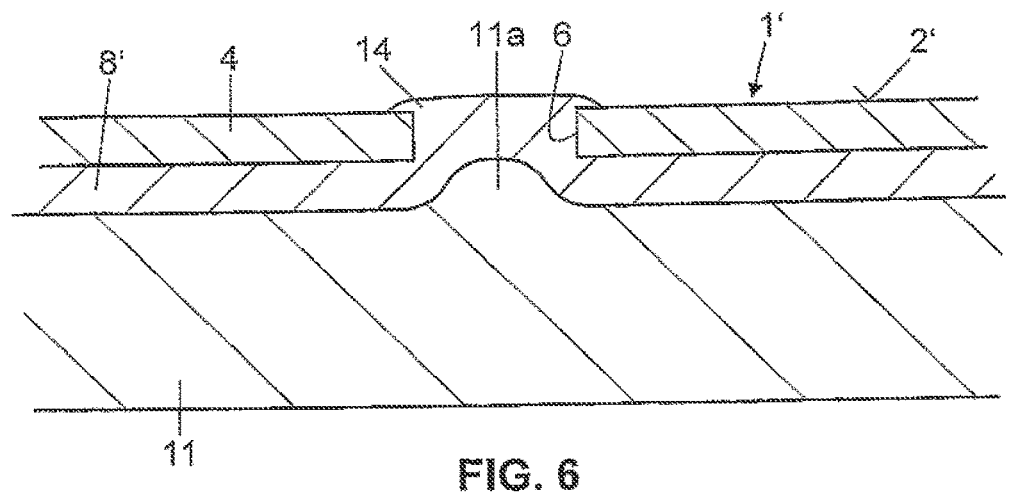

These regions 8' are flush with the viewing side 2. The regions 8' fully fill the through-holes 6. In particular, by the regions 8', edges 13 (FIGS. 3 and 4) in the through-holes 6 are covered by the regions 8'. The sharpness of these edges 13 is therefore eliminated by the regions 8' and, furthermore, no gaps through which parts or even liquid could enter are formed on these edges 13. The foil 8 may, however, protrude on the viewing side 2. The foil 8 may for example form bumps 14 protruding on the viewing side, as shown by FIG. 6. The component 1' shown in FIG. 6 has a foil 8' which fully fills the through-hole 6, and furthermore protrudes on a viewing side 2' and forms the bumps 14. The layer 11, as can be seen, engages with a likewise bump-shaped region 11a into the foil 8' in the region of the through-hole 6.

Figure 7:
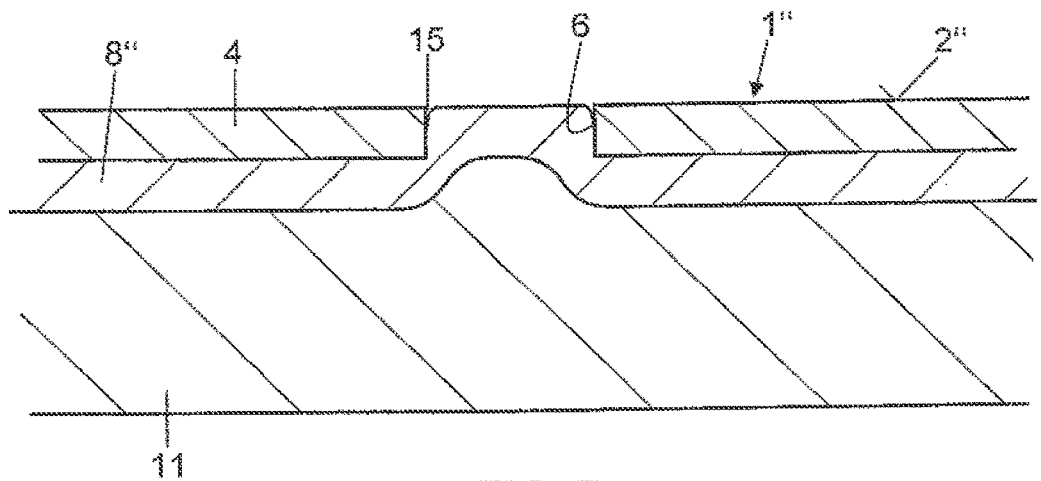
Figure 8:
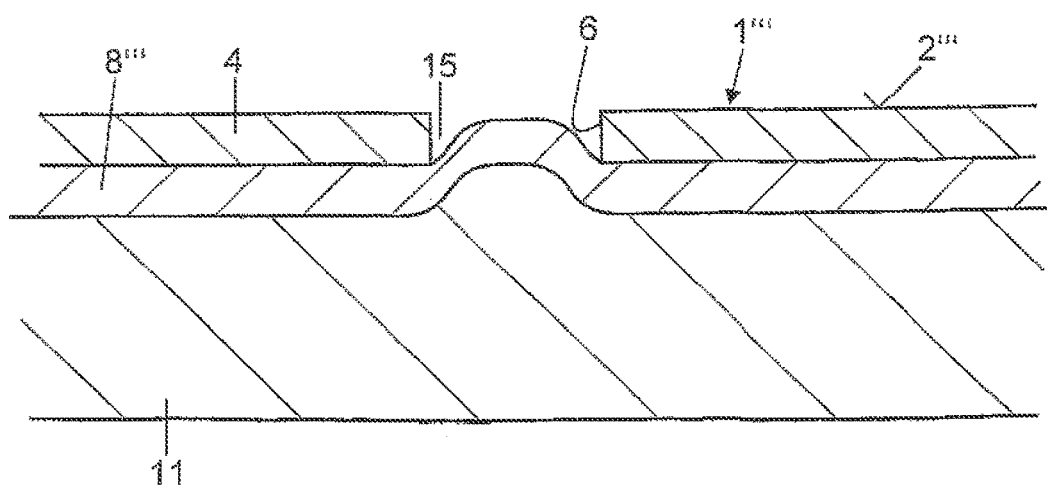

FIG. 7 shows a component 1" in which a foil 8" is flush with a viewing side 2", but does not fully fill the through-hole 6 so that there is a space 15 between the foil 8" and the decorative element 4. In the component 1''' shown in FIG. 8, a foil 8''' engages into the through-hole 6, but is not flush with a viewing side 2''' and likewise forms a space 15.

The invention therefore makes it possible to produce components 1 to 1''' having substantially different viewing sides 2 to 2'''.

The layer 11, like the foil 8, is preferably translucent or transparent, so that the field 3 can be illuminated from a backside 12. The layer 11 may have fastening means (not shown here) by which the component can be fastened, for example to a body of a motor vehicle.

Figure 4:
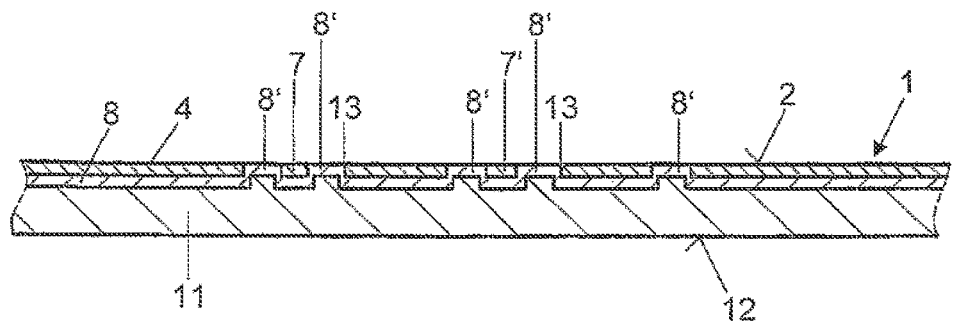
FIG. 4 shows a section through the component according to the invention on the line IV-IV of FIG. 5.
Figure 5:
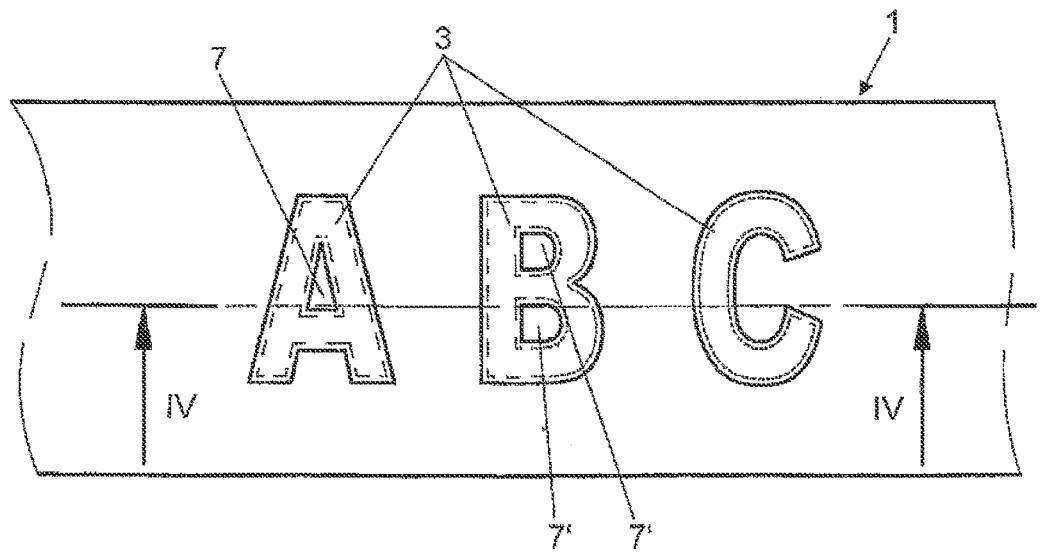
FIG. 5 shows a view of a subregion of the viewing side of a component according to the invention and FIGS. 6 to 8 show partial sections through variants of the component according to the invention.

In the field 3, according to FIGS. 1 and 5, there are island-shaped parts 7 and 7', respectively. According to FIG. 4, these parts 7 and 7' are embedded in the foil 8 and are therefore fixed by the latter. These island-shaped parts 7 are preferably flush with the viewing side 2.

The preferred method for producing the component 1 will be explained in more detail below.

In a first step, the two-dimensionally extending decorative element 4 is produced, for example from a material in web form. The through-holes 6 are produced, for example, by lasering or stamping. The two-dimensionally extending decorative element 4 is fixed in a holder (not shown here). The fixing is carried out, for example, by a vacuum which is applied on the viewing side 2. The island-shaped parts 7 formed when producing the through-holes 6 are likewise fixed by the vacuum.

In a second step, the foil 8 is applied onto the backside 5. The foil 8 is preferably adhesively bonded onto the backside 5. The foil 8 and/or the two-dimensionally extending decorative element 4 are in this case provided with an adhesive layer or adhesive parts (not shown here). The adhesive bonding or application of the foil 8 is preferably carried out here using a roller (not shown here). Once the foil 8 has been applied onto the two-dimensionally extending decorative element 4, the two-dimensionally extending decorative element 4 is removed from the holder. Island-shaped parts 7 and 7' are now fixed by the foil 8.

The two-dimensionally extending decorative element 4, provided with the foil 8, is now placed in a mold cavity of an injection-molding tool (not shown here). The injection-molding tool may be configured as is conventional. After the injection-molding tool has been closed, the layer 11 is produced by back-molding the inserted part. By the injection-molding pressure, the foil 8 is deformed in the region of the through-holes 6 and penetrates into the through-holes 6. Correspondingly, the layer 11 penetrates into the foil 8 in the region of the through-holes 6, as can be seen in FIG. 4. The component 1 can now be released from the mold.

The layer 11 may alternatively be produced by coextrusion. The two-dimensionally extending decorative element 4 with the applied foil 8 is in this case drawn through the extrusion nozzle, while the layer 11 is applied continuously. The two-dimensionally extending decorative element 4 and the foil 8 in this case form a web. It is also possible to produce the layer 11 by injection-embossing, which is likewise an injection-molding method.

LIST OF REFERENCES

1 component
2 viewing side
3 field
4 two-dimensionally extending decorative element
5 backside
6 through-holes
7 island-shaped part
8 foil
9 front side
10 backside
11 layer
12 backside
13 edge
14 bumps
15 space

The invention claimed is:

1. A component which comprises
   a two-dimensionally extending decorative element having at least one through-hole, a viewing side and a backside and comprising at least one island-shaped part being provided inside at least one through-hole,
   an illumination element for illuminating the at least one through-hole,
   at least one foil, which is at least locally translucent or transparent and is coextensively applied on the backside of the two-dimensionally extending decorative element, and
   at least one layer being produced by back molding and being applied on a backside of the at least one foil, the at least one layer being translucent and being formed at least locally as a diffuser,
   wherein the at least one foil penetrates at least partially into the at least one through-hole due to a deformation in the region of the at least one through-hole as a result of the pressure of the back molding during the production of the component,
   and wherein the at least one island-shaped part is embedded in the foil and therefore fixed by the foil.

2. The component as claimed in claim 1, wherein the foil is flush with the viewing side of the two-dimensionally extending decorative element in the region of the at least one through-hole.

3. The component as claimed in claim 1, wherein the at least one through-hole is filled essentially fully by the at least one foil.

4. The component as claimed in claim 1, wherein the foil has a thickness in the range of from one millimeter to 0.05 millimeter.

5. The component as claimed in claim 1, wherein it is intended for automobile construction.

6. The component as claimed in claim 1, wherein the at least one layer in turn engages into the at least one foil, and is connected thereto, in the region of the at least one through-hole.

7. The component as claimed in claim 1, wherein the two-dimensionally extending decorative element is produced from a metal sheet.

8. The component as claimed in claim 1, wherein the at least one through-hole forms a field that represents several letters that can be seen on the viewing side.

9. The component as claimed in claim 4, wherein the foil has a thickness in the range of from 0.1 millimeter to 0.3 millimeter.

10. The component as claimed in claim 5, wherein it is intended to produce a door sill protector strip.

11. The component as claimed in claim 1, wherein the two-dimensionally extending decorative element has a thickness of one millimeter or less.

12. The component as claimed in claim 1, wherein the two-dimensionally extending decorative element is produced from a metal sheet and has a thickness of one millimeter or less, and wherein the foil has a thickness in the range of from one millimeter to 0.05 millimeter.

* * * * *